United States Patent
Sulzle

[11] Patent Number: 5,669,115
[45] Date of Patent: Sep. 23, 1997

[54] MECHANICAL CONVEYOR BELT FASTENER

[75] Inventor: Walther Sulzle, Rosenfeld, Germany

[73] Assignee: Wilhelm Sulzle, Rosenfeld, Germany

[21] Appl. No.: 675,013

[22] Filed: Jul. 3, 1996

[30] Foreign Application Priority Data

Jul. 4, 1995 [DE] Germany .................. 195 24 384.6

[51] Int. Cl.⁶ .................................................. F16G 3/00
[52] U.S. Cl. .......................... 24/33 B; 24/33 C; 24/33 F
[58] Field of Search ........................... 24/33 B, 33 R, 24/33 C, 33 P, 33 F; 474/253, 255, 256

[56] References Cited

U.S. PATENT DOCUMENTS

| | | | |
|---|---|---|---|
| 938,511 | 11/1909 | Purple | 24/33 B |
| 1,300,632 | 4/1919 | Millar | 24/33 B |
| 1,482,282 | 1/1924 | Adams | 24/33 B |
| 2,097,108 | 10/1937 | Timmerbeil | 24/33 C |
| 2,224,532 | 12/1940 | Biller | 24/33 B |

FOREIGN PATENT DOCUMENTS

| | | | |
|---|---|---|---|
| 0992264 | 10/1951 | France | 24/33 B |
| 0620657 | 10/1935 | Germany | 24/33 B |
| 0670914 | 1/1939 | Germany | 24/33 C |
| 0257020 | 6/1928 | Italy | 24/33 B |

*Primary Examiner*—Victor N. Sakran
*Attorney, Agent, or Firm*—Antonelli, Terry, Stout & Kraus, LLP

[57] ABSTRACT

A mechanical belt fastener for joining the open ends of a conveyor belt has a first row and a second row of legs arranged parallel to one another with a distance between the rows on both sides of a folding area. The legs are bendable in the folding area to form loops and have bent tips that penetrate material of the belt. Legs of the two rows extending lengthwise on both sides of the folding area and the legs in the first row in a first section extend up to a continuous first strip that extends transversely with respect to lengths of the legs. The legs of the first section are attached to the first strip, and the legs adjacent to one another in each row are of different lengths relative to the folding area. Each two legs of the second row are connected through a second strip with one another to form leg pairs and the second strip is interrupted in a direction of immediately adjacent leg pairs of the second row. The bent tips of the legs of different lengths in the first and second rows are arranged in four different planes to provide a staggered arrangement of the tips penetrating the material of the belt.

8 Claims, 4 Drawing Sheets

MECHANICAL CONVEYOR BELT FASTENER

The invention relates to a mechanical belt fastener according to the preamble of the main claim.

Belt fasteners of this type, made of strip steel for example, are known. They are usually sold pre-bent into a V-shape. The ends of the legs are pointed and directed inward at a certain angle. These fasteners are needed for joining conveyor belts together.

To create an articulated joint, the fasteners are inserted at both ends of a belt cut off at right angles, with the eyes fitting into one another combwise. The ends are then connected releasably or hinged and with articulation with one another by a hinge pin pushed through.

In contrast to the likewise known wire or belt hooks, which have legs and tips of different lengths and hence staggered (long-short-long), the use of such connectors has the disadvantage that the connecting strength is approximately 30–40% less or lower. This is due to the fact that the tips penetrate the belt to the same depth on both the top and the bottom of the belt, and perforate the belt along a line. In addition, the connector tips, which are coarser by comparison with wire hooks, cut through a relatively large number of the carcass fibers that contribute to the strength of the belt, especially when they penetrate hard belt materials.

Despite the disadvantages listed above, connectors or fasteners made of strip steel are frequently used since they result in a smoother and more covered joint. Further advantages include the abrasion resistance of the connectors as a result of the wider contact surface, for example in belts that move or run with sliding, i.e. in a slider bed.

The goal of the invention is to design a fastener according to the preamble of the main claim in such fashion that the joint strength and/or the loadability of the joint and its elasticity, especially with regard to channel pulleys over which the belts run, is considerably improved. This goal is achieved according to the invention in a fastner according to the species by virtue of its characterizing features as contained in the preamble of the main claim.

The subclaims show preferred embodiments of the invention.

The legs of the first and second rows of legs each have two different lengths, preferably up to a total of four different lengths, with these different length dimensions alternating with one another. During the assembly of the belt, the tips located at the ends of the legs penetrate the belt in two planes on the top and bottom of the belt, pass through the belt, and are then bent again on the other side. By virtue of this special arrangement, the belt is penetrated in up to four planes instead of only one. As a result of the penetration points being staggered, no uniform fracture line or perforation results in the belt tension support of the belt. The static connecting strength increases by up to 75% depending on the belt design.

An arrangement is preferred in which both the first and the second row of legs have different lengths that alternate with one another. Since the individual legs then have a total of four alternating lengths, the tips located on the extensions of the legs can penetrate four different planes. The different lengths are chosen in such fashion that the penetration points of the tips are located in different planes in both the transverse and lengthwise directions. As a result, the connecting strength is increased further.

The continuous strip in this embodiment is preferably located on the top of the belt, resulting in an advantageous effect when it passes around the pulleys. The interrupted strips are mounted on the bottom of the belt, resulting in a favorable effect during running, especially over convex pulleys. Additional attachment of the legs to a strip, even though it is interrupted, ensures that the tips can penetrate in a straight line even into the hardest belt materials without being bent or deflected. This also ensures that damage to the belt tensioning element is limited to an absolute minimum.

The two strips (continuous on the top of the belt and interrupted on the bottom of the belt) result in an increase in the clamping effect and likewise contribute to an increase in the joint strength, since the retention point of the joint is displaced away from the tips of the fasteners.

In conventional fasteners it is advantageous that when the joint is made in soft belts, a folding of up to ten degrees takes place at the ends of the fastners. The tips, mounted staggered, produce a support in the connecting area and thus prevent folding.

Another advantage of providing the interrupted strip is that the material thickness of the fastener can be reduced without adversely affecting the separating effect.

The preferred embodiments of the invention will now be described in greater detail with reference to the drawings.

FIG. 1 the fastener in the non-folded state;

Figure 1:
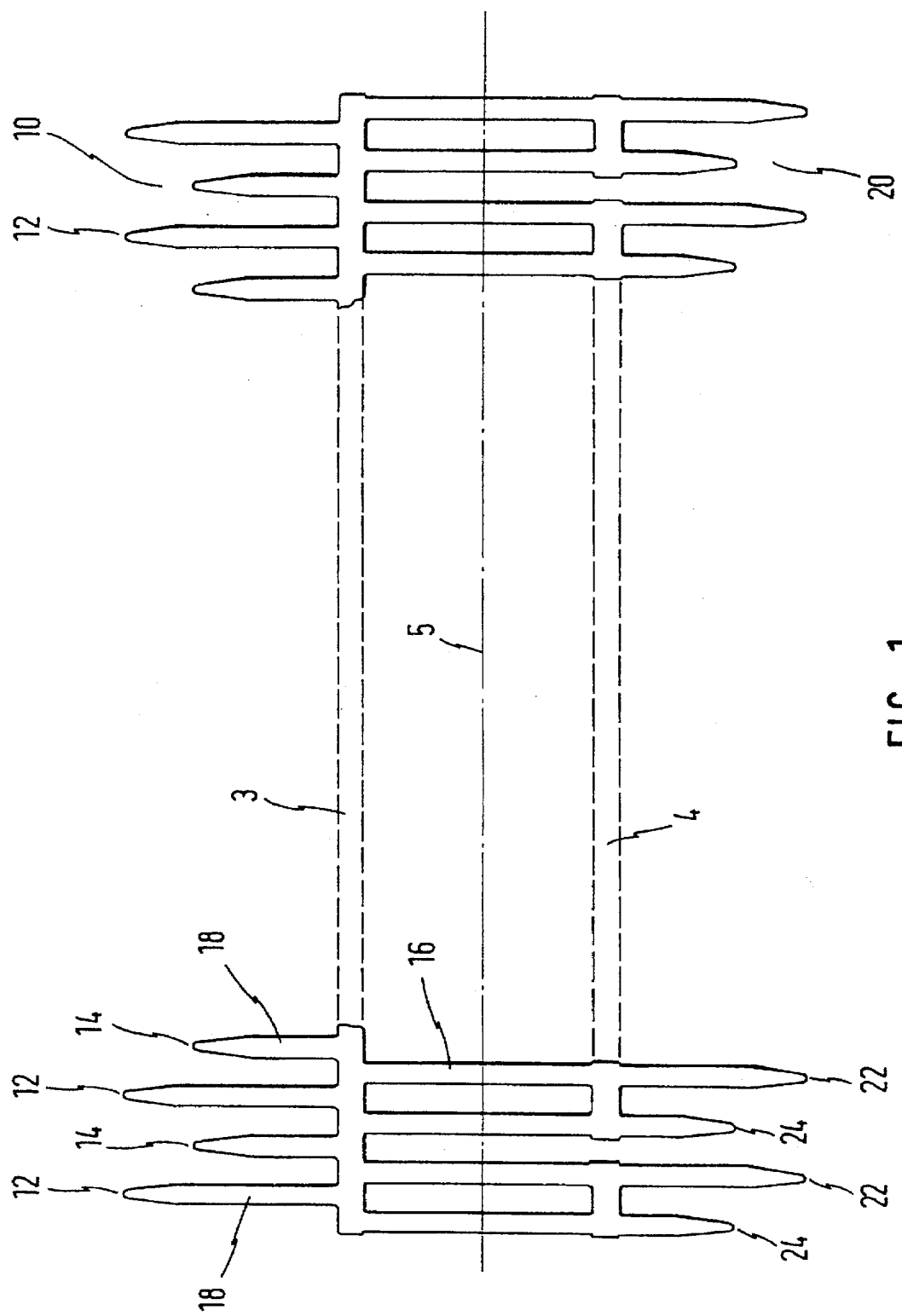

FIG. 1 is a schematic top view of the two ends of a strip in the non-folded and/or unbent state. Bending area 5, when bent, produces eyes or loops 8, each of which meshes combwise with the eyes or loops of a second fastener, said eyes or loops being connected together by a hinge pin 6.

The individual lengths of the legs of the rows are measured from bending area 5. The longest leg 12 of the fastener is located on the side, which is characterized by continuous strip 3. The third-longest leg 14 is likewise on this side. Legs 12, 14 are arranged alternately.

The second longest leg 22 and the shortest leg 24 are located on the side with interrupted strip 4. Legs 22, 24 are likewise arranged alternately.

In the embodiment shown in FIG. 1, the sequence of different leg lengths is as follows: 12-22-14-24, etc. A reversal or a different arrangement of this leg arrangement is possible and conceivable, for example 12-24-14-22, etc.

Figure 2:
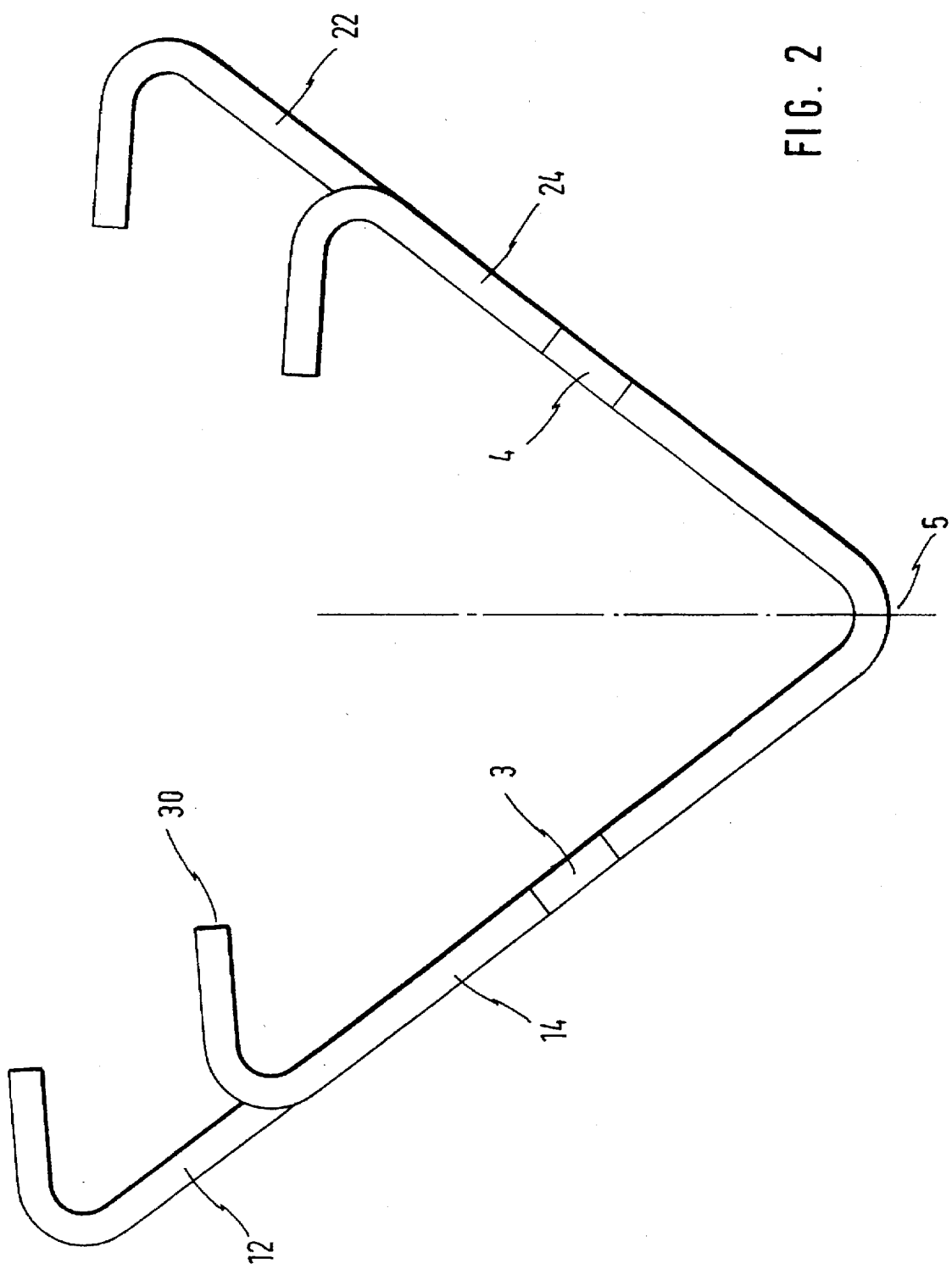
FIG. 2 shows a fastener pre-bent in a V-shaped in a sectioned side view.

FIG. 2 shows a fastener in the prebent V-shape. It shows that points or tip ends 30 located on legs of different lengths are arranged in four different planes.

Figure 3:
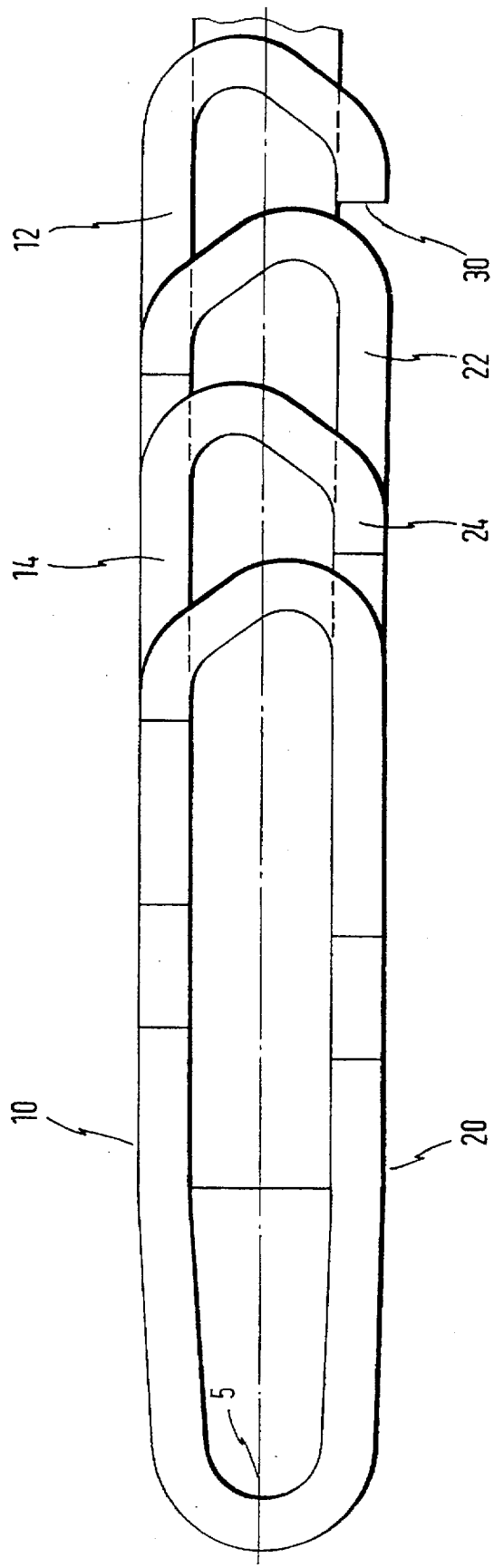
FIG. 3 is a sectioned side view of a mounted fastener.

FIG. 3 shows a fastener in the mounted state in cross section. One open end of a belt is marked with reference numeral 1.

Figure 4:
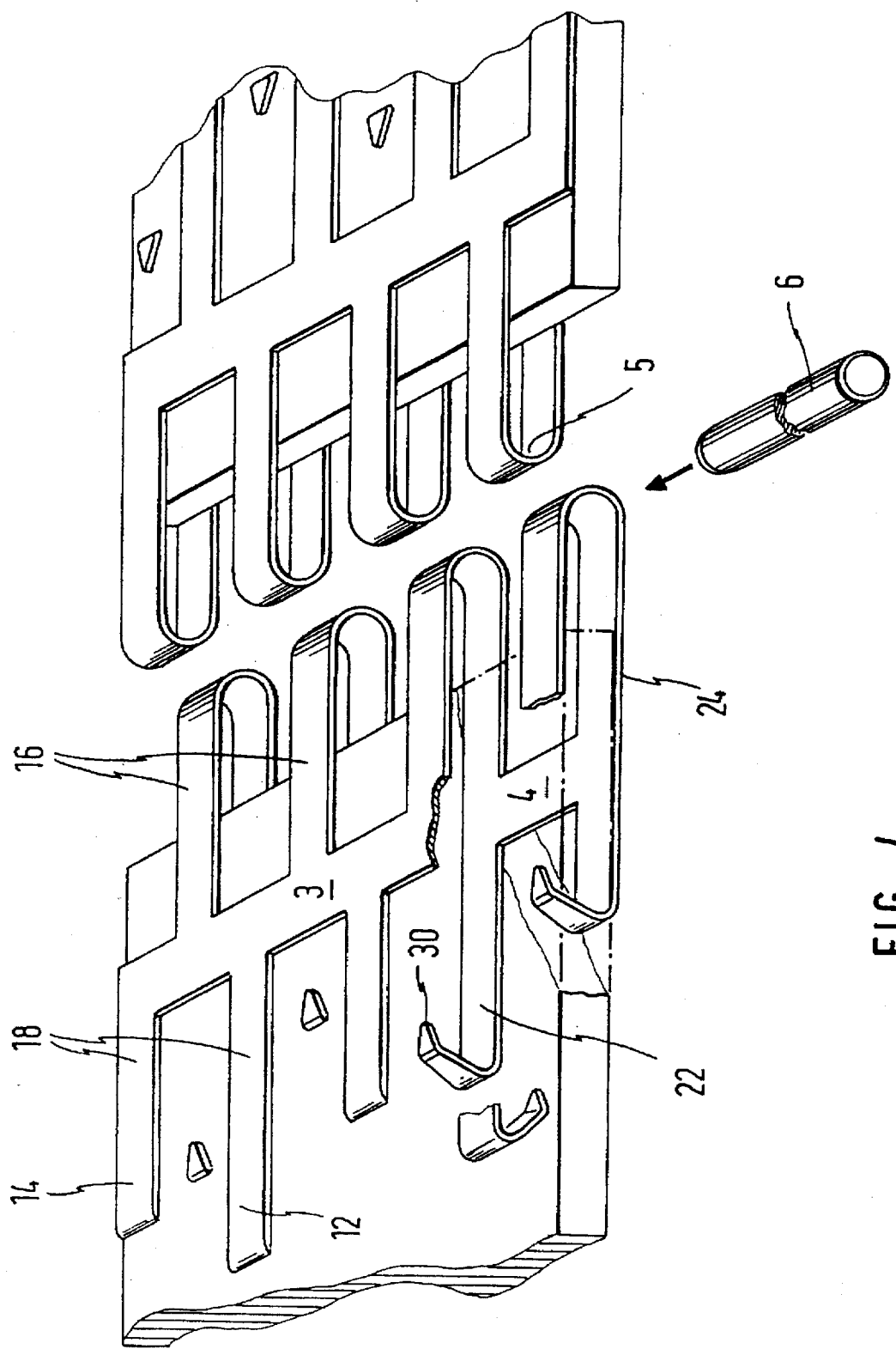
FIG. 4 is a perspective view of the two open ends of a belt, into each of which ends a four-member joining element has been inserted.

In FIG. 4 the arrangement of legs of different lengths is shown at ends 1, 2 of the belt. The perspective view shows the two open ends 1 and 2 of a belt into each of which a four-member element has been inserted for example. The parts that are identical to those in FIGS. 1 to 3 have the same reference numerals in FIG. 4. Reference numeral 6 refers to the coupling rod which links the two reinforced ends 1 and 2 of the belt after they have been fitted together combwise to form an endless belt.

I claim:

1. A mechanical belt fastener for joining the open ends of a conveyor belt, said fastener comprising a first row and a second row of legs arranged parallel to one another with a distance between the rows on both sides of a folding area, said legs being bendable in the folding area to form loops and having bent tips that penetrate material of the belt, legs of the two rows extending lengthwise on both sides of the folding area and the legs in the first row in a first section extending up to a continuous first strip that extends transversely with respect to lengths of said legs, said legs of the first section begin attached to said first strip, and the legs adjacent to one another in each row being of different lengths relative to the folding area, each two legs of the second row being connected through a second strip with one another to form leg pairs and said second strip being interrupted in a direction of immediately adjacent leg pairs of the second row; the bent tips of the legs of different lengths in the first and second rows being arranged in four different planes.

2. The belt fastener according to claim 1, wherein a second section of the legs of the first row abuts the first section at the first strip and is located opposite gaps between the legs of the first section.

3. The belt fastener according to claim 2, wherein continuous first strip and each second strip being arranged symmetrically with respect to the folding area.

4. The belt fastener according to claim 2, wherein the continuous first strip and a plurality of interrupted second strips are arranged asymmetrically with respect to the folding area.

5. The belt fastener according to claim 2, wherein the lengths of the legs of each pair of legs in the second row are different from the lengths of the legs in the first row.

6. The belt fastener according to claim 1, wherein the continuous first strip and each second strip are arranged symmetrically with respect to the folding area.

7. The belt fastener according to claim 1, wherein the continuous first strip and a plurality of interrupted second strips are arranged asymmetrically with respect to the folding area.

8. The belt fastener according to claim 1, wherein the lengths of the legs of each pair of legs in the second row are different from the lengths of the legs in the first row.

* * * * *